United States Patent [19]
Peek et al.

[11] Patent Number: 5,357,615
[45] Date of Patent: Oct. 18, 1994

[54] ADDRESSING CONTROL SIGNAL CONFIGURATION IN A COMPUTER SYSTEM

[75] Inventors: Greg A. Peek; Craig D. Cedros, both of Beaverton, Oreg.

[73] Assignee: Intel Corporation, Santa Clara, Calif.

[21] Appl. No.: 811,465

[22] Filed: Dec. 19, 1991

[51] Int. Cl.$^5$ .............................................. G06F 15/02
[52] U.S. Cl. ..................... 395/275; 395/575
[58] Field of Search ............... 395/550, 575, 275, 375, 395/425, 500; 371/15.1, 16.5, 19, 21.6, 22.1, 22.5, 22.6, 24, 71; 364/221.7, 221.8, 264.1, 266.4, 580, 247, 247.1, 247.2, 247.3, 254.8, 255.4

[56] References Cited

U.S. PATENT DOCUMENTS

| | | | |
|---|---|---|---|
| 4,023,142 | 5/1977 | Woessner | 395/325 |
| 5,029,166 | 7/1991 | Jarwala et al. | 371/22.1 |
| 5,144,627 | 9/1992 | Horie et al. | 371/22.1 |
| 5,157,781 | 10/1992 | Harwood et al. | 395/575 |
| 5,157,782 | 10/1992 | Tuttle et al. | 395/575 |

*Primary Examiner*—Dale M. Shaw
*Assistant Examiner*—Moustafa M. Meky
*Attorney, Agent, or Firm*—Blakely, Sokoloff, Taylor & Zafman

[57] ABSTRACT

A circuit and processing logic is used to test, configure, and control the operation of computer system resource addressing control signals. The programmable circuit of the present invention determines when, in an I/O access cycle, the resource addressing control (IOCHRDY) signal should be activated by an I/O mapped system resource. The present invention includes lost circuitry for determining whether a particular system resource operates best in a late IOCHRDY mode or an early IOCHRDY mode. The test logic will force the IOCHRDY signal to remain active for an extended period of time. By extending the deactivation time of the IOCHRDY signal far beyond the time at which the deactivation would normally occur, the responsiveness of a command strobe (IORD/IOWR) may be tested. If the deactivation of the command strobe IORD/IOWR follows the extended deactivation time of the IOCHRDY signal, the command strobe (IORD/IOWR) is properly responsive to the IOCHRDY signal and proper operation of the I/O access control logic is verified. If, however, the extended activation of the IOCHRDY signal causes the command strobe (IORD/IOWR) to deactivate prior to the deactivation of the IOCHRDY signal, a nonresponsive command strobe (IORD/IOWR) signal is present and thus a failure condition is detected. A processor-readable bit in a control register indicates a successful or unsuccessful IOCHRDY test condition.

21 Claims, 3 Drawing Sheets

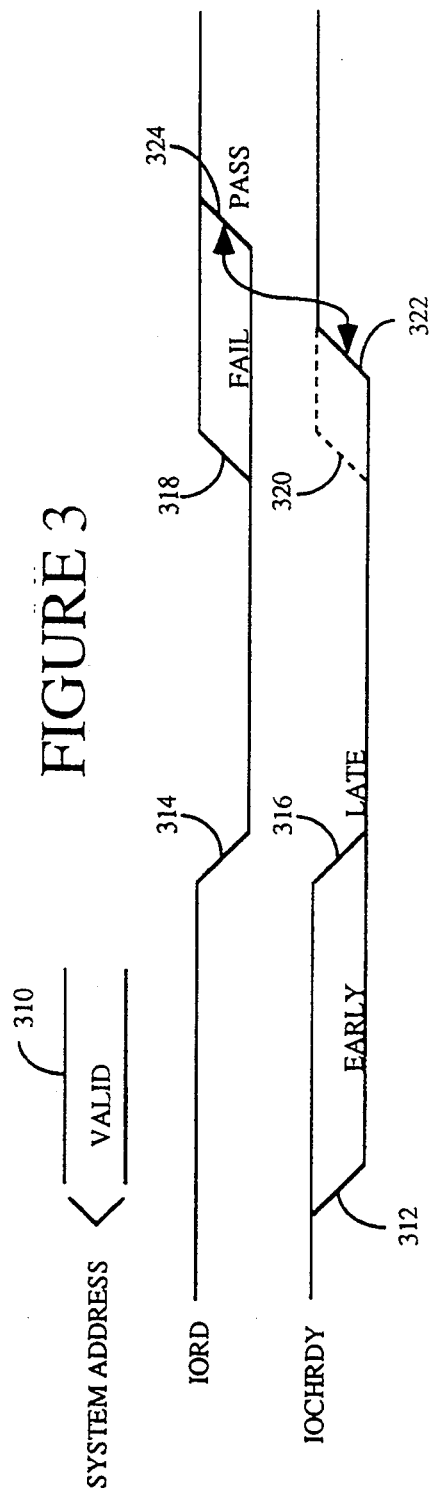

ADDRESSING CONTROL SIGNAL CONFIGURATION IN A COMPUTER SYSTEM

BACKGROUND OF THE INVENTION

1. Field of the Invention

The present invention relates to computer systems. Specifically, the present invention relates to the configuration and control of signals used to access input/output (I/O) mapped computer system resources.

2. Related Art

Many computers use a technique for mapping various portions of a system memory map to various system resources. Such computer system resources include expansion memory boards and/or network interface logic. Two main types of mapping schemes may exist in these systems: a memory mapping scheme, or; an input/output (I/O) mapping technique.

In a memory mapped system, a particular system resource may be accessed by applying a predetermined system address or one of a range of system addresses to a computer system bus during memory access cycles.

In an I/O mapped system, a particular system resource may be accessed when a system address or one of a range of system addresses is applied to the computer system bus during an I/O cycle. In I/O mapped systems, at least one control signal is typically provided for signaling the completion of a resource access request. Such a control signal is often denoted the input/output (I/O) channel ready (IOCHRDY) signal. In some systems, an I/O access cycle time must be extended using the IOCHRDY signal to allow time for the addressed system resource to respond. Most computer systems using an IOCHRDY signal require the IOCHRDY signal to transition from a high state to a low state shortly after a command strobe (i.e., an I/O read (IORD) signal or an I/O write (IOWR) signal) becomes active. If this occurs, the access cycle length will be extended until the IOCHRDY signal is deactivated. Other computer systems, however, will not reliably extend the memory access cycle time unless the IOCHRDY signal transitions from a high state to a low state at least 15 nanoseconds before the command strobe (IORD/IOWR) becomes active. Systems requiring the active IOCHRDY signal prior to the command strobe (IORD/IOWR) are often called early IOCHRDY systems. Other systems not requiring an early IOCHRDY signal are often called normal IOCHRDY systems or sometimes late IOCHRDY systems.

In order to accommodate both types of IOCHRDY implementations (i.e., the early IOCHRDY implementation and the late IOCHRDY implementation), prior art systems employ the use of hardware jumpers or other hardware means for defining a point of time in the resource access cycle when the IOCHRDY transitions to an active state. Unfortunately, the use of jumpers in this manner leads to many problems. If a system resource circuit board is configured incorrectly, corrupted data and/or system crashes may result. Moreover, an improperly configured jumper corresponding to an IOCHRDY implementation may be very difficult to detect. Even though the computer system will clearly be acting improperly, it will not be clear that the sequencing of the IOCHRDY signal is the source of the problem.

Thus, a better means for configuring and controlling the operation of computer system resource addressing control signals is needed.

SUMMARY OF THE INVENTION

The present invention is a circuit in a computer system for correctly testing, configuring, and controlling the proper operation of computer system resource addressing control signals. This circuit correctly determines the need for an early or late IOCHRDY signal activation without the need for hardware jumpers or the need for computer user intervention. The circuit of the preferred embodiment may be used in combination with software for performing a test operation to determine whether an early or late IOCHRDY signal is required. The test operation is followed by the programming of a programmable register that indicates the necessary IOCHRDY signal implementation. The programmable circuit of the present invention determines when, in an I/O access cycle, the IOCHRDY signal should be activated by an I/O mapped system resource.

The circuit of the present invention includes an I/O mapped software control register for controlling the operation and testing of the IOCHRDY signal. One bit in this control register is used for specifying one of two operating modes, each corresponding to a different timing of the activation of the IOCHRDY signal. In the first operating mode, the IOCHRDY signal is activated at nearly the same time or subsequent to the activation of a command strobe (IORD/IOWR) received from a processor. This first operating mode is denoted a late IOCHRDY signal. A second operating mode activates the IOCHRDY signal prior to the activation of a command strobe (IORD/IOWR). This second operating mode is denoted an early IOCHRDY activation mode. The early IOCHRDY mode is provided because some systems will not extend I/O access cycles reliably unless the IOCHRDY signal is activated prior to the activation of the command strobe (IORD/IOWR).

The present invention includes testing logic for testing the operation of the IOCHRDY signal in each of its operating modes and recording the result in a bit of a control register. The control register therefore contains bits used for enabling the testing of the IOCHRDY signal and for recording the results of an IOCHRDY test.

The circuit of the present invention further includes IOCHRDY output control logic which generates the IOCHRDY signal on an output line with an activation timing corresponding to the input received by IOCHRDY output control logic. System address is presented to IOCHRDY output control logic and used to determine whether an access made by a processor or other device is within the I/O mapped address region corresponding to the system resource being controlled by the circuit of the present invention. In combination with a system address, a command strobe (IORD/IOWR) is also presented to IOCHRDY output control logic. The command strobe is used to initiate an input/output read operation (IORD) or an input/output write operation (IOWR). During a normal I/O access cycle, the command strobe is activated a short time after a system address is presented.

IOCHRDY output control logic further includes logic for receiving an IOCHRDY mode indication from the control register. If the signal so received indicates a late IOCHRDY/node, the IOCHRDY output control logic generates an active IOCHRDY signal on the output line at nearly the same time or subsequent to the activation of the IORD/IOWR signal. If, however, mode in the control register indicates an early IOCHRDY mode, IOCHRDY output control logic generates an active IOCHRDY signal on the output line prior to the activation of the IORD/IOWR signal.

The present invention includes test circuitry for determining whether a particular system resource operates best in a late IOCHRDY/node or an early IOCHRDY mode. The majority of this test circuitry is included within test logic coupled to IOCHRDY output control logic. The test logic receives a test enable signal which enables the IOCHRDY test mode of the present invention. When the test mode is enabled by an active test enable signal, the test logic will force the IOCHRDY signal to remain active for an extended period of time. When the appropriate system resource is addressed, the IOCHRDY output control logic activates a decode signal when a system address is received that addresses the region within the system address range assigned to that particular system resource. Thus, when the test logic receives an active test enable signal and an active decode signal, the test logic activates a force signal which forces the IOCHRDY signal output on the output line to remain active for an extended period of time. In the preferred embodiment, this extended period of activation of the IOCHRDY signal is approximately 12 us. (microseconds).

By extending the deactivation time of the IOCHRDY signal far beyond the time at which the deactivation would normally occur, the responsiveness of the command strobe (IORD/IOWR) may be tested. If the deactivation of the command strobe IORD/IOWR follows the extended deactivation time of the IOCHRDY signal, the command strobe (IORD/IOWR) is properly responsive to the IOCHRDY signal and proper operation of the I/O access control logic is verified. If, however, the extended activation of the IOCHRDY signal causes the command strobe (IORD/IOWR) to deactivate prior to the deactivation of the IOCHRDY signal, a nonresponsive command strobe (IORD/IOWR) signal is present and thus a failure condition is detected.

When the IOCHRDY test mode is enabled and the I/O system resource is addressed, the test logic activates the force signal for an extended period of time which causes the IOCHRDY output control logic to activate the IOCHRDY signal for a corresponding extended period of time. The test logic then waits for the deactivation of the command strobe (IORD/IOWR). If the command strobe (IORD/IOWR) signal transitions to an inactive state subsequent to the deactivation of the force signal, the IORD/IOWR signal is responsive to the extended IOCHRDY signal. This successful test result is output by the test logic and stored in a bit of the control register. If, however, the IORD/IOWR signal transitions to an inactive state prior to the deactivation of the force signal, the IORD/IOWR signal is not responsive to the extended IOCHRDY activation. In this case, a test failure condition is output and stored in a bit of the control register. A bit of the control register indicates a successful or unsuccessful IOCHRDY test condition. This bit may subsequently be read by a processor. Thus, the circuit of the present invention may be used to detect and configure the proper operating mode for a resource addressing control signal.

The present invention is therefore a circuit for testing, configuring, and controlling the timing of control signals in a computer system, the circuit comprising:

control logic for generating a first control signal on an output line;

test logic coupled to the control logic, the test logic having:

a. force signal generation logic for modifying the first control signal, b. decode signal receiving logic for receiving a second control signal, and c. test result generation logic for determining if the second control signal is responsive to the first control signal modified by the force signal generation logic, a corresponding result being produced by the test result generation logic;

a control/test register coupled to the test logic for receiving the result, the control/test register being readable by a processor.

It is therefore an object of the present invention to provide a circuit in a computer system for configuring the operation of computer system resource addressing control signals. It is a further object of the present invention to provide a circuit including a programmable register wherein the sequencing of an IOCHRDY signal may be programmably configured. It is a further object of the present invention to provide a circuit including a programmable register wherein an IOCHRDY test mode may be enabled or disabled. It is a further object of the present invention to provide a circuit including a programmable register wherein a result of an IOCHRDY test may be read by a processor. It is a further object of the present invention to provide a circuit including IOCHRDY output control logic for driving the IOCHRDY signal in a preconfigured timing sequence. It is a further object of the present invention to provide a circuit including IOCHRDY test logic For determining whether a command strobe (IORD/IOWR) is responding to a delayed IOCHRDY signal. It is a further object of the present invention to provide a circuit wherein IOCHRDY test logic indicates a successful test result if the command strobe (IORD/IOWR) responds to a delayed IOCHRDY signal and indicates a failure test result if the command strobe (IORD/IOWR) does not respond to a delayed IOCHRDY signal.

These and other objects of the present invention will become apparent as presented and described in the following detailed description of the preferred embodiment of the present invention.

BRIEF DESCRIPTION OF DRAWINGS

FIG. 3 is a timing diagram of the signals operating in the present invention.

DETAILED DESCRIPTION OF THE PREFERRED EMBODIMENT

The present invention is a circuit in a computer system which provides a means for testing, configuring, and controlling the operation of computer system resource addressing control signals.

In the following description, numerous specific details are set forth in order to provide a thorough understanding of the present invention; however, it will be apparent to one of ordinary skill in the art that these specific details need not be used to practice the present invention. In other circumstances, well known structures, circuits, and interfaces have not been shown in detail in order not to unnecessarily obscure the present invention.

Figure 1:
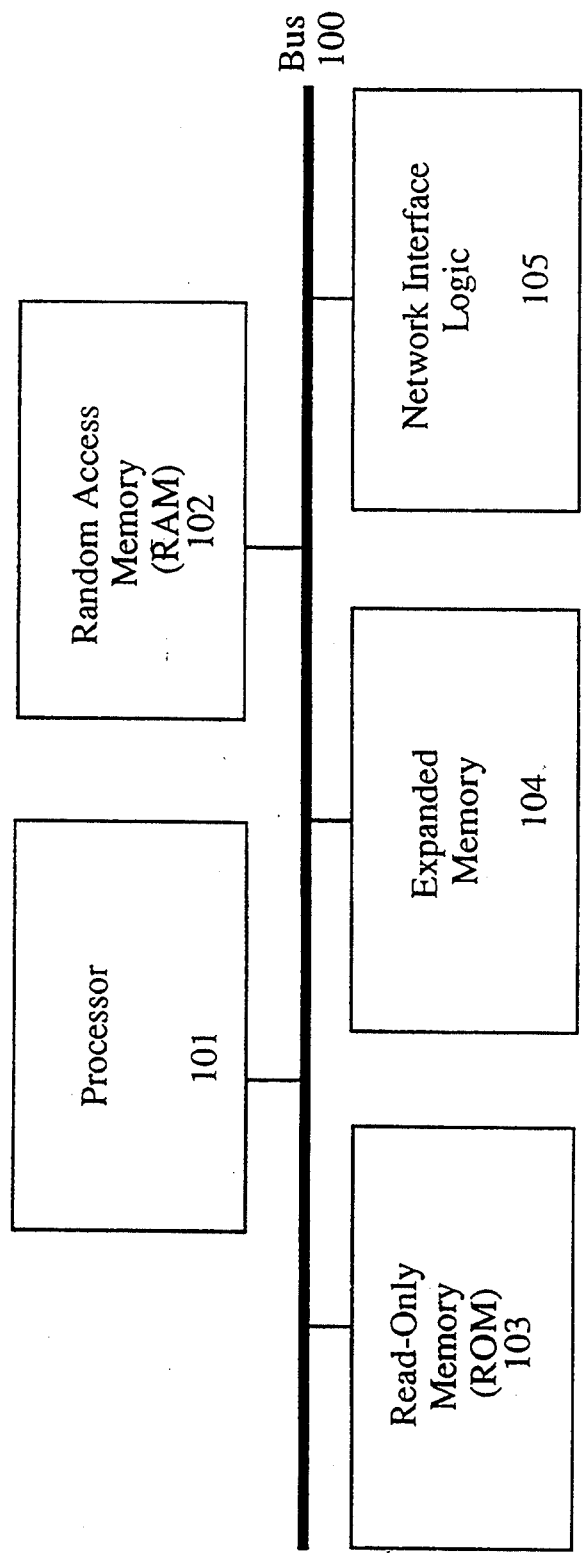
FIG. 1 illustrates a typical computer system configuration in which the circuit of the present invention operates.

Referring to FIG. 1, a typical computer system in which the circuit of the present invention operates is illustrated. In general, such computer systems, as illustrated by FIG. 1, comprise a bus 100 for communicating information, a processor 101 coupled with the bus for processing information, a random access memory (RAM) 102 coupled with the bus 100 for storing information and instructions for the processor 101, and a read only memory (ROM) 103 coupled with the bus 100 for storing static information and instructions for the processor 101. Optionally, the computer system may also include expanded memory 104 coupled with the bus 100 which provides additional random access storage space in addition to random access memory 102. The computer system may also optionally include network interface logic 105 coupled with the bus 100 and providing a means by which processor 101 may access an external network.

The preferred embodiment of the present invention is implemented on an IBM PC brand personal computer manufactured by IBM Corporation, Armonk, New York. Bus 100 in the preferred embodiment is a 16-bit ISA bus.

It will be apparent to those skilled in the art that other computer systems may be used with the present invention. Similarly, it will be apparent to those skilled in the art that the computer system illustrated in FIG. 1 may include additional components not illustrated in FIG. 1 or may be configured without components that are illustrated in FIG. 1.

In general, processor 101 may access RAM 102, ROM 103, expanded memory 104, and/or network interface logic 105 (collectively referred to as system resources) by applying a system address corresponding to the desired system resource to bus 100 along with corresponding control signals. Each of the system resources on bus 100 may be mapped to a particular region of a system memory map addressable by processor 101. In addition, particular system resources may be configured to respond to either a memory access cycle or an input/output (I/O) cycle. The type of cycle is defined by processor 101 using a command signal. The architecture of the computer system illustrated in FIG. 1 is well known to those of ordinary skill in the art.

Some of the system resources such as those illustrated in FIG. 1 may be I/O mapped resources. I/O mapped resources respond to I/O access cycles made by processor 101. In general, processor 101 initiates an I/O access cycle by applying a system address to bus 100 in combination with an I/O addressing command signal (also called a command strobe or IORD/IOWR). In response to the I/O access request by the processor, the I/O mapped system resource activates an I/O channel ready (IOCHRDY) signal to acknowledge the processor access request. Typically, the activation of the IOCHRDY signal may occur at one of two points in the access request cycle. In most systems, the activation of the IOCHRDY signal occurs at nearly the same time or shortly after the activation of the command strobe (IORD/IOWR) provided by processor 101. In other systems, an early IOCHRDY signal must be activated a short time prior to the activation of the command strobe (IORD/IOWR). The configuration of one of these two modes of operation for the IOCHRDY signal is typically perforated by configuring a set of hardware jumpers on a circuit board of the I/O mapped system resource. If the timing of the IOCHRDY activation is not properly configured, the processor 101 will not properly acknowledge completion of an I/O access request and a system failure will result.

Figure 2:
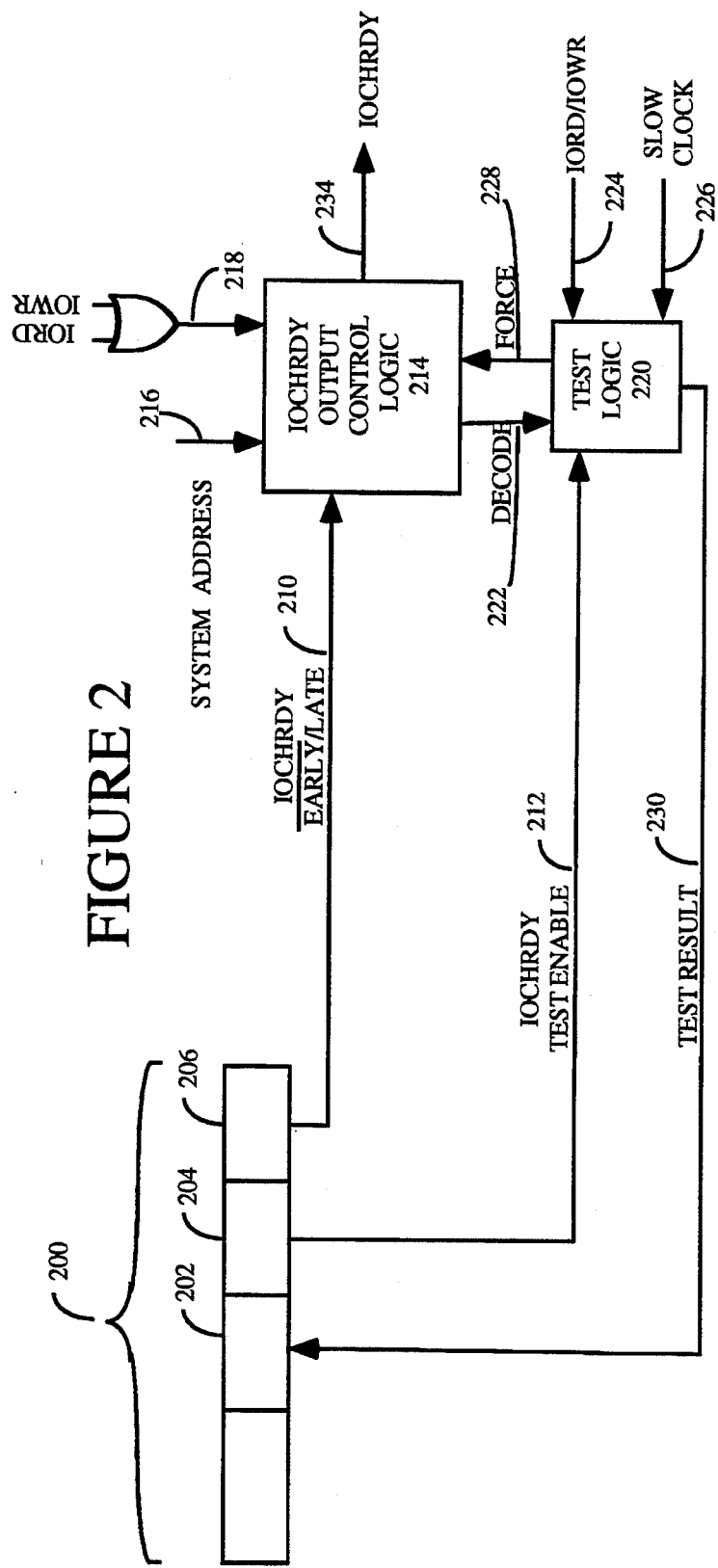
FIG. 2 is an illustration of the circuit of the preferred embodiment.

Referring now to FIG. 2, the circuit of the present invention is illustrated. This circuit correctly determines the need for an early or late IOCHRDY signal activation without the need for hardware jumpers or the need for computer user intervention. The circuit of the preferred embodiment illustrated in FIG. 2 may be used in combination with software for performing a test operation to determine whether an early or late IOCHRDY signal is required. The test operation is followed by the programming of a programmable register that indicates the necessary IOCHRDY signal implementation. The programmable circuit of the present invention determines when, in an I/O access cycle, the IOCHRDY signal should be activated by an I/O mapped system resource.

The circuit of the present invention is typically included within the hardware of a particular system resource, such as network interface logic 105 illustrated in FIG. 1. It will be apparent to those skilled in the art, however, that the circuit of the present invention may also be included within other hardware components or resources of a computer system such as the one illustrated in FIG. 1.

Referring again to FIG. 2, the circuit illustrated in FIG. 2 includes an I/O mapped software control register 200. Control register 200 is a programmable register containing a set of bits for controlling the operation and testing of the IOCHRDY signal. One such bit, bit 206, is used for specifying one of two operating modes, each corresponding to a different timing of the activation of the IOCHRDY signal. In the first operating mode, the IOCHRDY signal is activated at nearly the same time or subsequent to the activation of a command strobe (IORD/IOWR) received from processor 101. This first operating mode is denoted a late IOCHRDY signal. Bit 206 of control register 200 may alternatively be set to indicate a second operating mode in which the activation of the IOCHRDY signal occurs prior to the activation of a command strobe (IORD/IOWR). This second operating mode is denoted an early IOCHRDY activation mode. The early IOCHRDY mode is provided because some systems will not extend I/O access cycles reliably unless the IOCHRDY signal is activated prior to the activation of the command strobe (IORD/IOWR). In many such systems, the IOCHRDY signal must be activated at least 15 ns prior to the activation of the command strobe (IORD/IOWR). The present invention solves the problem of determining which IOCHRDY activation mode is needed for a particular computer system. The present invention therefore includes testing logic for testing the operation of the IOCHRDY signal in each of its operating modes and recording the result in a bit of software control register 200. Register 200 therefore contains bit 204 used for enabling the testing of the IOCHRDY signal. Similarly, bit 202 is provided for recording the results of an IOCHRDY test.

The circuit of the present invention further includes IOCHRDY output control logic 214 as illustrated in FIG. 2. IOCHRDY control logic 214 generates the IOCHRDY signal on line 234 with an activation timing corresponding to the input received by control logic 214. Input to control logic 214 includes a system address on lines 216. An address presented on lines 216 is used to determine whether an access made by processor 101 or other device is within the I/O mapped address region corresponding to the system resource being controlled by the circuit of FIG. 2. The system address region assigned to a particular system resource may be predetermined and fixed within output control logic 214 prior to the operation of the circuit. For addresses presented on lines 216 outside of the assigned I/O mapped region, the circuit of the present invention takes no action. For addresses presented on lines 216 within the I/O mapped region, an IOCHRDY signal is generated on line 234. In combination with a system address on lines 216, a command strobe (IORD/IOWR) is presented to IOCHRDY output control logic 214 on line 218. The command strobe on line 218 is used to initiate an input/output read operation (IORD) or an input/output write operation (IOWR). During a normal I/O access cycle, the command strobe on line 218 is activated a short time after an address is presented on lines 216. A means for generating an IOCHRDY signal based on the input of a system address and a command strobe (IORD/IOWR) is well known in the art.

IOCHRDY output control logic 214 includes logic for receiving an IOCHRDY mode indication on line 210 from control register 200. If the signal received on line 210 indicates a late IOCHRDY mode, IOCHRDY output control logic 214 generates an active IOCHRDY signal on line 234 at nearly the same time or subsequent to the activation of the IORD/IOWR signal received on line 218. If, however, the signal on line 210 indicates an early IOCHRDY mode, IOCHRDY output control logic 214 generates an active IOCHRDY signal on line 234 prior to the activation of the IORD/IOWR signal received on line 218. Typically, the early IOCHRDY signal is activated when a system address is presented on lines 216. In the preferred embodiment, an early IOCHRDY signal is activated at least 15 ns prior to the activation of the IORD/IOWR signal received on line 218. It will be apparent to those skilled in the art that an early IOCHRDY signal activation may occur at a different point in the I/O access cycle.

The present invention includes test circuitry for determining whether a particular system resource operates best in a late IOCHRDY mode or an early IOCHRDY mode. The majority of this test circuitry is included within test logic 220 illustrated in FIG. 2. A smaller portion of circuitry in support of the IOCHRDY test mode is provided within IOCHRDY output control logic 214. Test logic 220 receives a test enable signal on line 212. As described earlier, a test enable bit 204 in control register 200 may be set to enable the IOCHRDY test mode of the present invention. When the test mode is enabled by an active signal on line 212, test logic 220 will force the IOCHRDY signal on line 234 to remain active for an extended period of time. When the appropriate system resource is addressed, the IOCHRDY output control logic 214 activates a decode signal 222 when a system address is received on line 216 that addresses the region within the system address range assigned to that particular system resource. This decode signal 222 is received by test logic 220. Thus, when test logic 220 receives an active test enable signal on line 212 and an active decode signal on line 222, test logic 220 activates a force signal 228 received by output control logic 214 which forces the IOCHRDY signal output on line 234 to remain active for an extended period of time. In the preferred embodiment, this extended period of activation of the IOCHRDY signal is approximately 12 us. (microseconds).

In a normal I/O access cycle, the deactivation of the IOCHRDY signal is followed by the deactivation of the command strobe (IORD or IOWR). In a properly operating system, the deactivation of the IORD or IOWR command strobe will always follow the deactivation of the IOCHRDY signal. Thus, the deactivation of the IORD or IOWR command strobe should always be responsive to the deactivation of the IOCHRDY signal. This condition may be tested to determine if the IOCHRDY control circuit is operating properly. By extending the deactivation time of the IOCHRDY signal far beyond the time at which the deactivation would normally occur, the responsiveness of the command strobe (IORD/IOWR) may be tested. If the deactivation of the command strobe IORD/IOWR follows the extended deactivation time of the IOCHRDY signal, the command strobe (IORD/IOWR) is properly responsive to the IOCHRDY signal and proper operation of the I/O access control logic is verified. If, however, the extended activation of the IOCHRDY signal causes the command strobe (IORD/IOWR) to deactivate prior to the deactivation of the IOCHRDY signal, a non responsive command strobe (IORD/IOWR) signal is present and thus a failure condition is detected. Thus, test logic 220 receives the command strobe (IORD/IOWR) on line 224 as illustrated in FIG. 2. Test logic 220 also receives a slow clock signal on line 226 which is used to produce the extended activation time of the IOCHRDY signal. When the IOCHRDY test mode is enabled as indicated on line 212 and the I/O system resource is addressed its indicated by an active decode signal on line 222, test logic 220 activates force signal 228 for an extended period of time which causes output control logic 214 to activate the IOCHRDY signal on line 234 for a corresponding extended period of time. Test logic 220 then waits for the deactivation of the command strobe (IORD/IOWR) received on line 224. If the IORD/IOWR signal on line 224 transitions to a deactive state subsequent to the deactivation of force signal 228, the IORD/IOWR signal is responsive to the extended IOCHRDY signal. This successful test result is output by test logic 220 on line 230 and stored in a bit 202 in control register 200. If, however, the IORD/IOWR signal 224 transitions to a deactive state prior to the deactivation of force signal 228, the IORD/IOWR signal is not responsive to the extended IOCHRDY activation. In this case, a test failure condition is output on line 230 and stored in bit 202 of control register 200. Thus, bit 202 of control register 200 indicates a successful or unsuccessful IOCHRDY test condition. This bit may subsequently be read by processor 101. A successful test result indicates that the IOCHRDY signal is more than likely operating in the proper mode (i.e., an early activation or a late activation). If an unsuccessful test result is indicated, an improper IOCHRDY mode is in use. The IOCHRDY mode may therefore be switched to the alternate mode by manipulation of bit 206 upon the detection of an unsuccessful test result. Thus, the circuit illustrated in FIG. 2 may be used to detect and configure the proper operating mode for a resource addressing control signal.

Referring now to FIG. 3, a timing diagram of the signals used in the present invention is illustrated. During an I/O access cycle, processor 101, or other device, presents a system address 310 on bus 100. The system address is presented to IOCHRDY output control logic 214 via line 216. If the system address 310 thus presented specifies an address within the I/O mapped address range corresponding to the particular system resource, an address match condition occurs and the particular system resource is addressed. If an early IOCHRDY mode has been configured, by appropriately setting bit 206 of control register 200, the IOCHRDY signal transitions to an active state at edge 312 upon the address match condition. At some time later in the cycle, the command strobe (IORD/IOWR) transitions to an active state at edge 314. If a late IOCHRDY mode had been previously configured, the activation of the IOCHRDY signal does not occur until edge 316 as shown in FIG. 3. The activation of the IOCHRDY signal in late mode at edge 316 occurs at nearly the same time or subsequent to the activation of the command strobe (IORD/IOWR) at edge 314. In a normal I/O access cycle (i.e., not an IOCHRDY test mode cycle), the IOCHRDY signal is deactivated at edge 320. During an IOCHRDY test mode, however, the activation of the IOCHRDY signal is extended to edge 322. In the preferred embodiment, the extended period of activation of the IOCHRDY signal is approximately 12 us. (microseconds). In a properly operating system, the deactivation of command strobe (IORD/IOWR) should occur at edge 324 subsequent to the deactivation of the IOCHRDY signal at edge 322. If this occurs, a successful test condition results. If, however, the IORD/IOWR signal is deactivated at edge 318 prior to the deactivation of the IOCHRDY signal at edge 322, an improper or failure condition exists. In this case, an unsuccessful test condition results. Thus, depending upon the deactivation edge of the IORD/IOWR signal in relation to the deactivation edge of the IOCHRDY signal, an appropriate IOCHRDY test condition may be determined.

Processing logic for testing the operation of the IOCHRDY signal in a particular system resource may be used in cooperation with hardware of the present invention illustrated in FIG. 2. This test processing logic may be used to properly configure control register 200 as a result of performing tests on the IOCHRDY signal operation. This test processing logic may be executed by processor 101.

Upon activation, the test processing logic first loads an IOCHRDY mode into bit 206 of control register 200. Means for setting a bit in a control register to a desired binary value is a technique well known in the art. Either the early IOCHRDY mode or the late IOCHRDY mode may initially be selected. The IOCHRDY test mode is then enabled using bit 204 of control register 200. A system address corresponding to the I/O mapped address of the system resource under test is then applied to bus 100. This system address is received by IOCHRDY output control logic 214 via lines 216. Upon receipt of the appropriate system address and the resulting address match condition, IOCHRDY output control logic 214 activates decode signal 222 to test logic 220. As a result of the active test enable signal on line 212 and the active decode signal on line 222, test logic 220 activates force signal 228. Force signal 228 is received by IOCHRDY control logic 214 which activates the IOCHRDY signal on line 234 for as long as the force signal 228 is active. Force signal 228 produces an extended IOCHRDY active condition. Test logic 220 then compares the deactivation edge of the command strobe (IORD/IOWR) 224 and the deactivation edge of the force signal 228. As described earlier, the test result is stored in bit 202 of control register 200. The test processing logic being executed by processor 101 may then read the IOCHRDY test results in bit 202. Means for reading the state of a bit or bits in a control register is a technique well known in the art. If a successful test result is indicated, the previously configured IOCHRDY mode as loaded in bit 206 of control register 200 is validated as being a successful mode. If, however, the test results in bit 202 indicate an unsuccessful test result, an alternative IOCHRDY mode must be loaded into bit 206 of control register 200 by the test processing software being executed by processor 101. The IOCHRDY test may then be repeated to verify the proper operation of the newly selected mode. In practical operation, it is desirable to repeat the IOCHRDY test procedure for the same mode for several iterations. If all iterations are successful, the IOCHRDY mode is validated. If, however, any one iteration results in an unsuccessful test result, the tested mode may be deemed unsatisfactory. A predetermined threshold of unsuccessful test iterations may be established in order to provide for some level of errors for a particular mode.

Thus, a means and method for testing, configuring, and controlling the operation of computer system resource addressing control signals is described.

Although the invention has been described herein with reference to a specific embodiment, many modifications and variations therein will readily occur to those skilled in the art. Accordingly, all such variations and modifications are included within the intended scope of the present invention as defined by the following claims.

What is claimed is:

1. In a computer system having a processor, a process for testing, configuring, and controlling timing of resource addressing control signals, said process comprising the steps of:

generating a resource addressing control signal on an output line;

modifying said resource addressing control signal;

receiving an addressing command signal from said processor;

determining if said addressing command signal is responsive to said resource addressing control signal modified in said modifying step, and producing a corresponding result and storing said result in a control/test register, said control/test register being readable by a processor.

2. The process as claimed in claim 1 including a step of:

receiving an addressing control mode signal, said resource addressing control signal changing state in a manner corresponding to said addressing control mode signal.

3. The process as claimed in claim 2 wherein said step of receiving an addressing control mode signal being performed by reading a programmable bit corresponding to said addressing control mode signal from said control/test register.

4. The process as claimed in claim 1 wherein said step of modifying further includes the step of forcing said resource addressing control signal to remain in a predetermined state.

5. The process as claimed in claim 1 further including a step of programmably enabling or disabling performance of said modifying step.

6. The process as claimed in claim 1 wherein said step of modifying further includes a step of activating said resource addressing control signal prior to activation of said addressing command signal.

7. The process as claimed in claim 1 wherein said step of modifying further includes a step of activating said resource addressing control signal subsequent to activation of said addressing command signal.

8. The process as claimed in claim 1 wherein said step of determining further includes a step of testing for a deactivation of said addressing command signal prior to a deactivation of said resource addressing control signal, said result being produced thereby indicating a failure condition.

9. The process as claimed in claim 1 wherein said step of determining further includes a step of testing for a deactivation of said addressing command signal subsequent to a deactivation of said resource addressing control signal, said result being produced thereby indicating a success condition.

10. The process as claimed in claim 1 further including steps of receiving an address from said processor, and generating a decode signal if said address is within a predetermined range, said decode signal enabling the performance of said modifying step.

11. The process as claimed in claim 1 further including the steps of:
configuring said test logic; and
controlling timing of said resource addressing control signal.

12. A circuit for testing, configuring, and controlling timing of a resource addressing control signal in a computer system, said circuit comprising:
a control/test register being readable and programmable by a processor:
resource addressing control logic coupled to said control/test register, said resource addressing control logic having means for generating a resource addressing control signal on an output line, said resource addressing control logic including means for receiving an address from said processor, means for receiving an addressing command signal from said processor, and means for receiving an addressing control mode stored in said control/test register, said resource addressing control signal changing state in a manner corresponding to said addressing control mode; and
test logic coupled to said resource addressing control logic and said control/test register, said test logic including means for modifying said resource addressing control signal and means for determining if said addressing command signal changes state in response to said resource addressing control signal modified by said means for modifying changing state, a corresponding result being produced by said means for determining and being received by said control/test register.

13. The circuit as claimed in claim 12 wherein said means for modifying further includes means for forcing said resource addressing control signal to remain in a predetermined state.

14. The circuit as claimed in claim 12 wherein said control/test register further includes means for programmably enabling or disabling operation of said test logic.

15. The circuit as claimed in claim 12 wherein said means for receiving an addressing control mode is coupled to said control/test register, said control/test register having a programmable bit corresponding to said addressing control mode.

16. The circuit as claimed in claim 12 wherein said means for modifying further includes means for receiving said addressing command signal, and means for activating said resource addressing control signal prior to activation of said addressing command signal.

17. The circuit as claimed in claim 12 wherein said means for modifying further includes means for receiving said addressing command signal, and means for activating said resource addressing control signal subsequent to activation of said addressing command signal.

18. The circuit as claimed in claim 12 wherein said means for determining further includes means for receiving said addressing command signal, and means for testing for a deactivation of said addressing command signal prior to a deactivation of said resource addressing control signal, said result being produced thereby indicating a failure condition.

19. The circuit as claimed in claim 12 wherein said means for determining further includes means for receiving said addressing command signal, and means for testing for a deactivation of said addressing command signal subsequent to a deactivation of said resource addressing control signal, said result being produced thereby indicating a success condition.

20. The circuit as claimed in claim 12 wherein said test logic further includes means for receiving a decode signal from said resource addressing control logic, said decode signal activating said means for modifying.

21. A circuit for testing, configuring, and controlling timing of a resource addressing control signal in a computer system, said circuit comprising:
a control/test register being readable and programmable by a processor;
control logic coupled to said control/test register, said control logic for generating said resource addressing control signal on an output line, said control logic including a circuit for receiving an address from said processor, a circuit for receiving an addressing command signal from said processor, and a circuit for receiving a second control signal as stored in said control/test register, said resource addressing control signal changing state in a manner corresponding to said second control signal;
test logic coupled to said control logic and said control/test register, said test logic including a circuit for receiving said addressing command signal, a circuit for modifying said resource addressing control signal and a circuit for determining if said addressing command signal changes state in response to said resource addressing control signal modified by said circuit for modifying changing state, a corresponding result being produced by said circuit for determining and being received by said control/test register.

* * * * *

UNITED STATES PATENT AND TRADEMARK OFFICE
CERTIFICATE OF CORRECTION

PATENT NO. : 5,357,615
DATED : Oct. 18, 1994
INVENTOR(S) : Greg A. Peek, et al

It is certified that error appears in the above-indentified patent and that said Letters Patent is hereby corrected as shown below:

Column 2, Line 67;    Delete "/node";    Insert in place thereof -- mode--

Signed and Sealed this

Nineteenth Day of September, 1995

Attest:

BRUCE LEHMAN

Attesting Officer      Commissioner of Patents and Trademarks